US012754375B1

(12) United States Patent
Cocilovo et al.

(10) Patent No.: US 12,754,375 B1
(45) Date of Patent: Oct. 6, 2026

(54) WAVEGUIDE DISPLAY HAVING PHASE COMPENSATION LAYERS

(71) Applicant: Apple Inc., Cupertino, CA (US)

(72) Inventors: Byron R Cocilovo, Boulder, CO (US); Lai Wang, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 281 days.

(21) Appl. No.: 18/743,909

(22) Filed: Jun. 14, 2024

Related U.S. Application Data

(60) Provisional application No. 63/511,508, filed on Jun. 30, 2023.

(51) Int. Cl.
*G02B 6/34* (2006.01)
*F21V 8/00* (2006.01)
*G02B 27/01* (2006.01)

(52) U.S. Cl.
CPC ............. *G02B 6/34* (2013.01); *G02B 6/0016* (2013.01); *G02B 27/0172* (2013.01)

(58) Field of Classification Search
None
See application file for complete search history.

(56) References Cited

U.S. PATENT DOCUMENTS 8,160,411 B2 4/2012 Levola et al.
10,578,876 B1 * 3/2020 Lam ...................... G02F 1/3544
10,823,894 B2 11/2020 Peroz et al.
10,877,277 B1 * 12/2020 Lu ........................ G02B 6/0056
10,983,263 B2 4/2021 Kleinman et al.
11,092,874 B1 * 8/2021 Zhang .................. G02F 1/3544
11,460,609 B2 10/2022 Peroz et al.
2009/0129116 A1 5/2009 Kim et al.
2016/0231568 A1 * 8/2016 Saarikko .............. G02B 5/1866
2019/0049562 A1 * 2/2019 Hirasawa ................ G01S 17/89
(Continued)

FOREIGN PATENT DOCUMENTS

CN 109239842 A 1/2019
EP 2733517 A1 5/2014
WO 2020243111 A1 12/2020
(Continued)

OTHER PUBLICATIONS

U.S. Appl. No. 18/469,451, filed Sep. 18, 2023.
(Continued)

*Primary Examiner* — Jerry Rahll
(74) *Attorney, Agent, or Firm* — Treyz Law Group, P.C.; Michael H. Lyons

(57) ABSTRACT

A display may include a substrate layered onto a waveguide. The substrate may include a first region with a first surface relief grating (SRG) and a second region that is non-diffractive or that includes a second SRG. The second region meets the first region at a boundary. A beam of light may be incident upon the substrate at the boundary. A phase compensation layer may be disposed on the waveguide overlapping the second region. The placement, thickness, and/or refractive index of the phase compensation layer may be selected to match the phase of portion of the beam that hits the first region to a phase of the portion of the beam that hits the second region. This may mitigate phase differences across the area of the beam, thereby maximizing the modulation transfer function of the display.

20 Claims, 10 Drawing Sheets

(56) References Cited

U.S. PATENT DOCUMENTS

| | | | |
|---|---|---|---|
| 2021/0072437 | A1 | 3/2021 | Singh et al. |
| 2022/0128817 | A1 | 4/2022 | Singh et al. |

FOREIGN PATENT DOCUMENTS

| | | | |
|---|---|---|---|
| WO | 2022235804 | A1 | 11/2022 |
| WO | 2023003854 | A1 | 1/2023 |

OTHER PUBLICATIONS

Bernard C. Kress et al., Waveguide combiners for mixed reality headsets: a nanophotonics design perspective, Nanophotonics, Oct. 7, 2020, pp. 41-74, vol. 10, No. 1, De Gruyter.

Jiasheng Xiao et al., Design of achromatic surface microstructure for near-eye display with diffractive waveguide, Optics Communications, Apr. 5, 2019, pp. 411-416, vol. 452, Elsevier, Amsterdam, NL.

U.S. Appl. No. 18/414,126, filed Jan. 16, 2024.

Richard G. Lyon et al., Externally Occulted Terrestrial Planet Finder Coronagraph: Simulations and Sensitivities, Proceedings of SPIE—The International Society for Optical Engineering, Dec. 2007, Society of Photo-optical Instrumentation Engineers, Bellingham, WA, United States.

* cited by examiner

WAVEGUIDE DISPLAY HAVING PHASE COMPENSATION LAYERS

This application claims the benefit of U.S. Provisional Patent Application No. 63/511,508, filed Jun. 30, 2023, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include virtual or augmented reality headsets with displays having optical elements that allow users to view the displays. If care is not taken, components used to display images can be bulky and might not exhibit desired levels of optical performance. For example, boundaries between the optical elements can cause unsightly cosmetic artifacts that detract from the appearance of the images.

SUMMARY

An aspect of the disclosure provides an electronic device. The electronic device can include a waveguide configured to propagate light. The electronic device can include a substrate on the waveguide, the substrate having a first region and a second region that meets the first region at a boundary. The electronic device can include a surface relief grating (SRG) in the first region of the substrate and configured to diffract the light. The electronic device can include a phase compensation layer overlapping the second region of the substrate.

An aspect of the disclosure provides a display. The display can include a waveguide configured to propagate light. The display can include a substrate on the waveguide, the substrate having a first region and a non-diffractive region that laterally abuts the first region at a boundary. The display can include a surface relief grating (SRG) in the first region of the substrate, wherein a first portion of the light is incident upon the SRG and a second portion of the light is incident upon the non-diffractive region. The display can include a layer overlapping the non-diffractive region of the substrate, wherein the layer has a thickness and a refractive index configured to match a phase of the second portion of the light to a phase of the first portion of the light.

An aspect of the disclosure provides a display. The display can include a waveguide configured to propagate light. The display can include a substrate on the waveguide, the substrate having a first region and a second region that laterally meets the first region at a boundary. The display can include a first surface relief grating (SRG) in the first region of the substrate, wherein a first portion of the light is incident upon the first SRG. The display can include a second SRG in the second region of the substrate, wherein a second portion of the light is incident upon the second SRG. The display can include a layer overlapping the second region of the substrate, wherein the layer has a thickness and a refractive index configured to match a phase of the second portion of the light to a phase of the first portion of the light.

DETAILED DESCRIPTION

Figure 1:
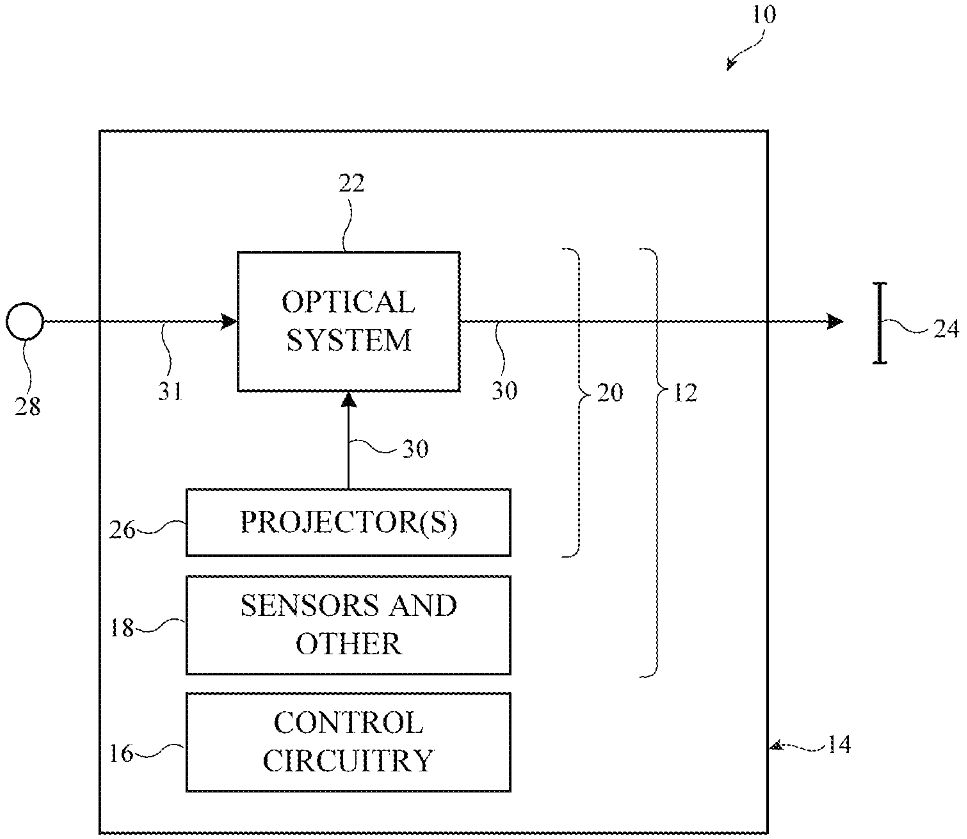
FIG. 1 is a diagram of an illustrative system having a display in accordance with some embodiments.

System 10 of FIG. 1 may be a head-mounted device having one or more displays. The displays in system 10 may include near-eye displays 20 mounted within support structure (housing) 14. Support structure 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as support structure 14. Each projector 26 may emit image light 30 that is redirected towards a user's eyes at eye box 24 using an associated one of optical systems 22. Image light 30 may be, for example, light that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, organic light-emitting diode displays, laser-based displays, or displays of other types. Projectors 26 may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light 30, etc.

Optical systems 22 may form lenses that allow a viewer (see, e.g., a viewer's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner, etc.) to allow real-world light 31 (sometimes referred to herein as world light 31 or ambient light 31) produced and/or reflected from real-world objects 28 (sometimes referred to herein as external objects 28) to be combined optically with virtual (computer-generated) images such as virtual images in image light 30. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of external objects and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
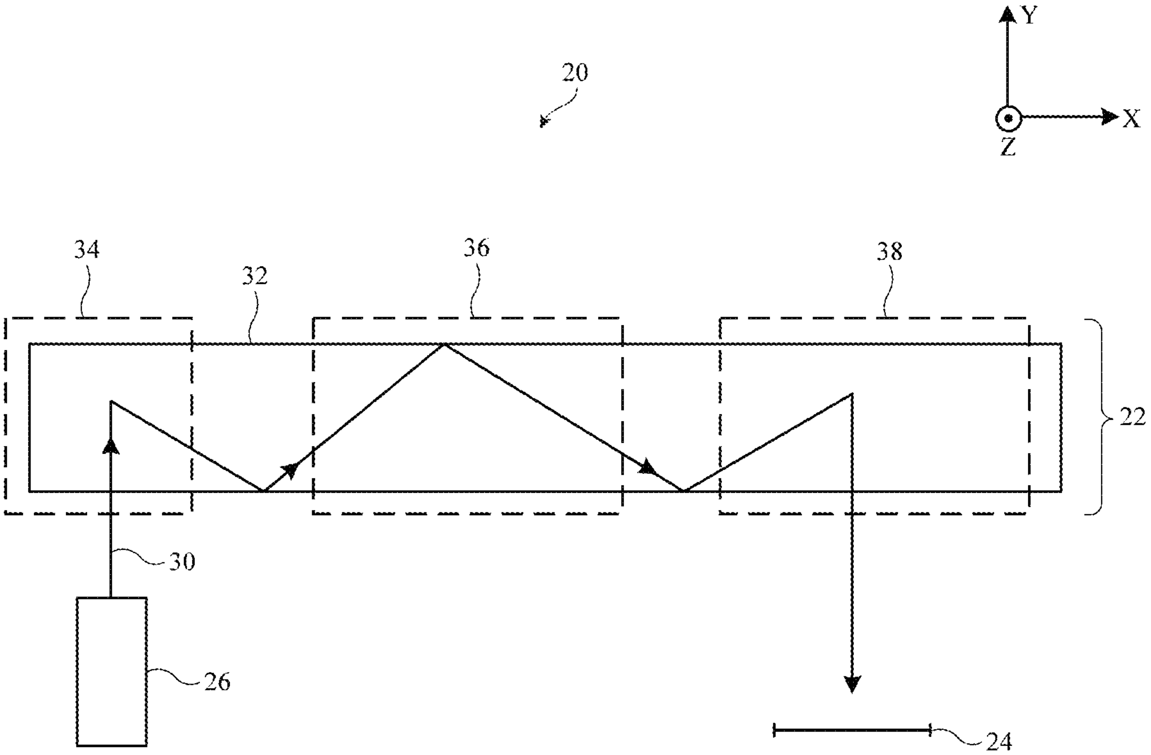
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms, surface relief gratings, etc.). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating medium may include photopolymers, gelatin such as dichromated gelatin, silver halides, holographic polymer dispersed liquid crystal, or other suitable holographic media.

Diffractive gratings on waveguide 32 may include holographic phase gratings such as volume holograms or thin-film holograms, meta-gratings, or any other desired diffractive grating structures. The diffractive gratings on waveguide 32 may also include surface relief gratings (SRGs) formed on one or more surfaces of the substrates in waveguide 32 (e.g., as modulations in thickness of a SRG medium layer), gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 32 if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 36, and output coupler 38. In the example of FIG. 2, input coupler 34, cross-coupler 36, and output coupler 38 are formed at or on waveguide 32. Input coupler 34, cross-coupler 36, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction +Y towards optical system 22. When image light 30 strikes input coupler 34, input coupler 34 may redirect image light 30 so that the light propagates within waveguide 32 via total internal reflection towards output coupler 38 (e.g., in direction +X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 36 is formed on waveguide 32, cross-coupler 36 may redirect image light 30 in one or more directions as it propagates down the length of waveguide 32 (e.g., towards output coupler 38 from a direction of propagation as coupled into the waveguide by the input coupler). In redirecting image light 30, cross-coupler 36 may also perform pupil expansion on image light 30 in one or more directions. In expanding pupils of the image light, cross-coupler 36 may, for example, help to reduce the vertical size of waveguide 32 (e.g., in the Z direction) relative to implementations where cross-coupler 36 is omitted. Cross-coupler 36 may therefore sometimes also be referred to herein as pupil expander 36 or optical expander 36. If desired, output coupler 38 may also expand image light 30 upon coupling the image light out of waveguide 32.

Input coupler 34, cross-coupler 36, and/or output coupler 38 may be based on reflective and refractive optics or may be based on diffractive (e.g., holographic) optics. In arrangements where couplers 34, 36, and 38 are formed from reflective and refractive optics, couplers 34, 36, and 38 may include one or more reflectors (e.g., an array of micromirrors, partial mirrors, louvered mirrors, or other reflectors). In arrangements where couplers 34, 36, and 38 are based on diffractive optics, couplers 34, 36, and 38 may include diffractive gratings (e.g., volume holograms, surface relief gratings, etc.).

The example of FIG. 2 is merely illustrative. Optical system 22 may include multiple waveguides that are laterally and/or vertically stacked with respect to each other. Each waveguide may include one, two, all, or none of couplers 34, 36, and 38. Waveguide 32 may be at least partially curved or bent if desired. One or more of couplers 34, 36, and 38 may be omitted. If desired, optical system 22 may include a single optical coupler that performs the operations of both cross-coupler 36 and output coupler 38 (sometimes referred to herein as an interleaved coupler, a diamond coupler, or a diamond expander) or cross-coupler 36 may be separate from output coupler 38. Implementations in which cross-coupler 36 or a single optical coupler that performs the operations of both cross-coupler 36 and output coupler 38 (e.g., which receives light from an input coupler) include surface relief gratings (SRGs) are described herein as an example.

Figure 3A:
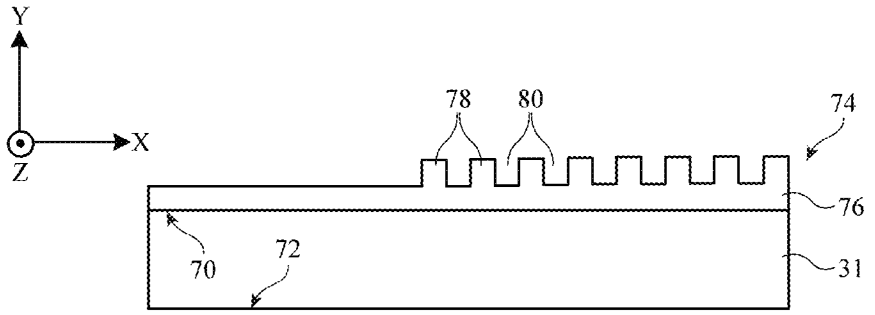
FIGS. 3A-3C are top views of illustrative waveguides provided with a surface relief grating in accordance with some embodiments.

FIG. 3A is a top view showing one example of how a surface relief grating may be formed on waveguide 32. As shown in FIG. 3A, waveguide 32 may have a first lateral surface 70 and a second lateral surface 72 opposite lateral surface 70 (sometimes referred to herein as waveguide surfaces). Waveguide 32 may include any desired number of one or more stacked waveguide substrates. If desired, waveguide 32 may also include a layer of grating medium sandwiched (interposed) between first and second waveguide substrates (e.g., where the first waveguide substrate includes lateral surface 70 and the second waveguide substrate includes lateral surface 72).

Waveguide 32 may be provided with a surface relief grating (SRG) such as surface relief grating 74. SRG 74 may be included in cross-coupler 36 or as part of an optical coupler that performs the operations of both cross-coupler 36 and output coupler 38 (e.g., a diamond expander or interleaved coupler), for example. SRG 74 may be formed within a substrate such as a layer of SRG substrate 76 (sometimes referred to herein as medium 76, medium layer 76, SRG medium 76, or SRG medium layer 76). While only a single SRG 74 is shown in SRG substrate 76 in FIG. 3A for the sake of clarity, SRG substrate 76 may include two or more SRGs 74 (e.g., SRGs having different respective grating vectors). If desired, at least a portion of each of the SRGs may be superimposed in the same volume of SRG substrate 76. In the example of FIG. 3A, SRG substrate 76 is layered onto lateral surface 70 of waveguide 32. This is merely illustrative and, if desired, SRG substrate 76 may be layered onto lateral surface 72 (e.g., the surface of waveguide 32 that faces the eye box).

SRG 74 may include peaks 78 and troughs 80 in the thickness of SRG substrate 76.

Peaks 78 may sometimes also be referred to herein as ridges 78 or maxima 78. Troughs 80 may sometimes also be referred to herein as notches 80, slots 80, grooves 80, or minima 80. In the example of FIG. 3A, SRG 74 is illustrated for the sake of clarity as a binary structure in which SRG 74 is defined either by a first thickness associated with ridges 78 or a second thickness associated with troughs 80. This is merely illustrative. If desired, SRG 74 may be non-binary (e.g., may include any desired number of thicknesses following any desired profile, may include ridges 78 that are angled at non-parallel fringe angles with respect to the Y axis, etc.), may include ridges 78 with surfaces that are tilted (e.g., oriented outside of the X-Z plane), may include troughs 80 that are tilted (e.g., oriented outside of the X-Z plane), may include ridges 78 and/or troughs 80 that have heights and/or depths that follow a modulation envelope, etc. If desired, SRG substrate 76 may be adhered to lateral surface 70 of waveguide 32 using a layer of optically clear adhesive (not shown). SRG 74 may be fabricated separately from waveguide 32 and may be adhered to waveguide 32 after fabrication or may be etched into SRG substrate 76 after SRG substrate 76 has already been layered on waveguide 32, for example.

Figure 3B:
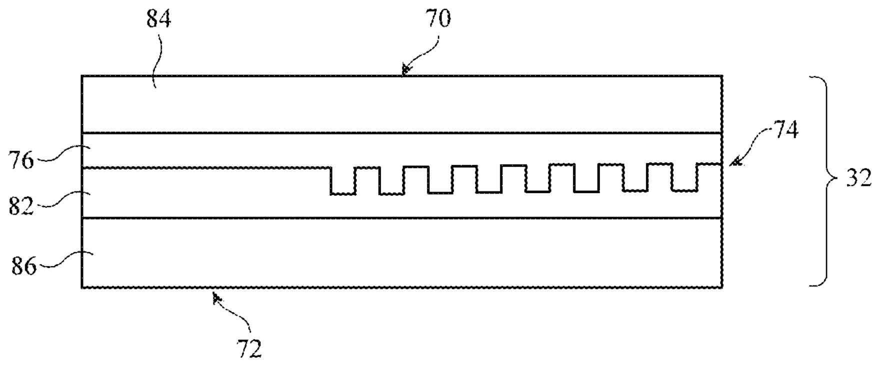

The example of FIG. 3A is merely illustrative. In another implementation, SRG 74 may be placed at a location within the interior of waveguide 32, as shown in the example of FIG. 3B. As shown in FIG. 3B, waveguide 32 may include a first waveguide substrate 84, a second waveguide substrate 86, and a media layer 82 interposed between waveguide substrate 84 and waveguide substrate 86. Media layer 82 may be a grating or holographic recording medium, a layer of adhesive, a polymer layer, a layer of waveguide substrate, or any other desired layer within waveguide 32. SRG substrate 76 may be layered onto the surface of waveguide substrate 84 that faces waveguide substrate 86. Alternatively, SRG substrate 76 may be layered onto the surface of waveguide substrate 86 that faces waveguide substrate 84.

Figure 3C:
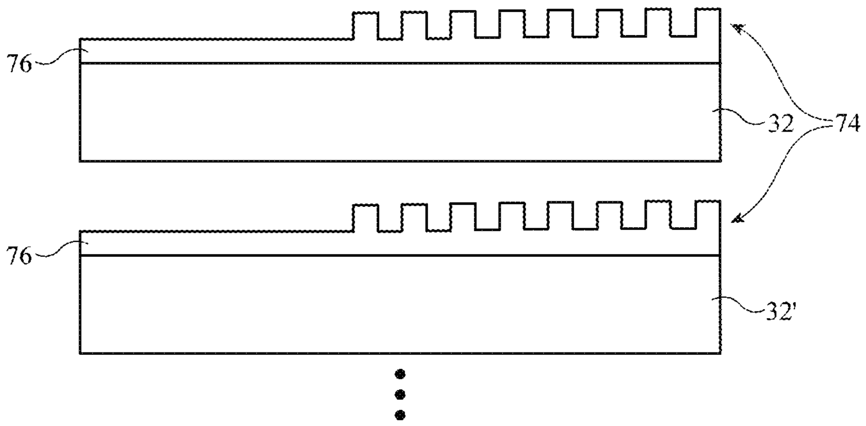

If desired, multiple SRGs 74 may be distributed across multiple layers of SRG substrate, as shown in the example of FIG. 3C. As shown in FIG. 3C, the optical system may include multiple stacked waveguides such as at least a first waveguide 32 and a second waveguide 32'. A first SRG substrate 76 may be layered onto one of the lateral surfaces of waveguide 32 whereas a second SRG substrate 76' is layered onto one of the lateral surfaces of waveguide 32'. First SRG substrate 76 may include one or more of the SRGs 74. Second SRG substrate 76' may include one or more of the SRGs 74. This example is merely illustrative. If desired, the optical system may include more than two stacked waveguides. In examples where the optical system includes more than two waveguides, each waveguide that is provided with an SRG substrate may include one or more SRG 74. While described herein as separate waveguides, waveguides 32 and 32' of FIG. 3C may also be formed from respective waveguide substrates of the same waveguide, if desired. The arrangements in FIGS. 3A, 3B, and/or 3C may be combined if desired.

Figure 4:
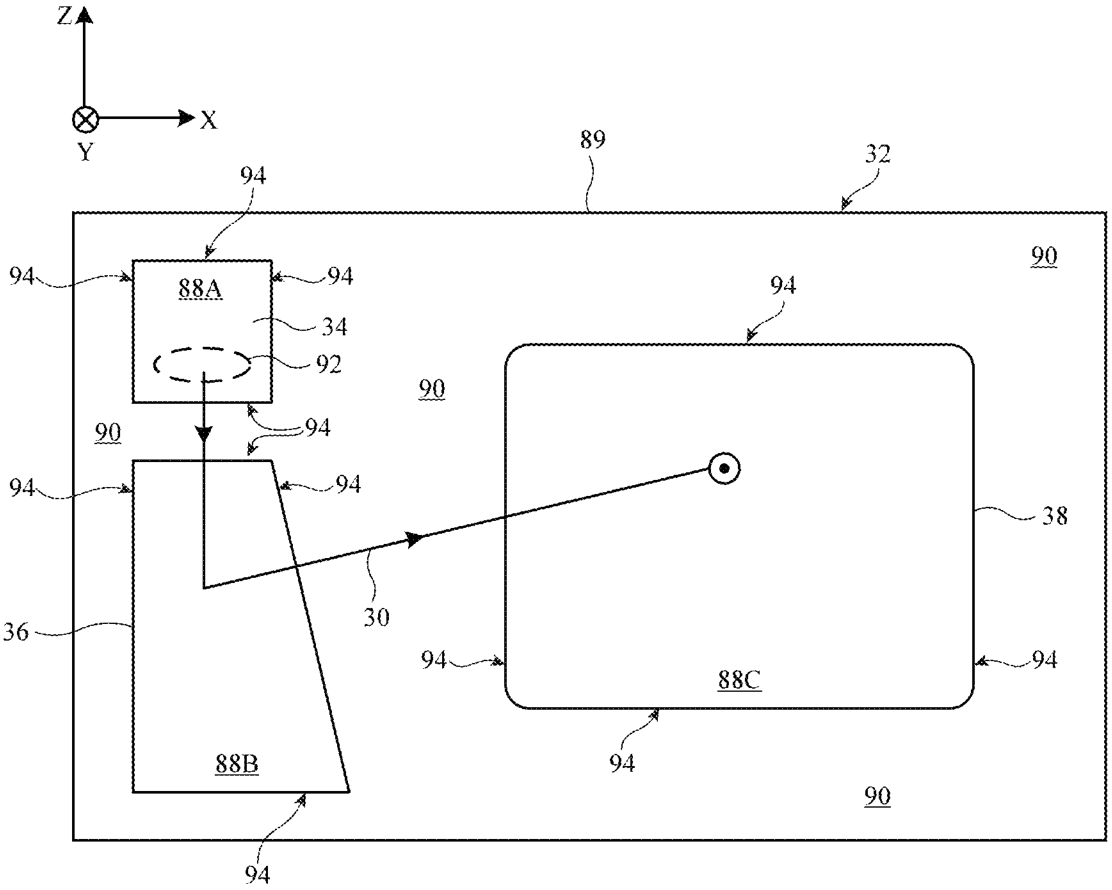
FIG. 4 is a front view of an illustrative waveguide having optical couplers formed from surface relief gratings in accordance with some embodiments.

If desired, waveguide 32 may include one or more substrates having regions that include diffractive gratings for input coupler 34, cross-coupler 36, and/or output coupler 38 and having regions that are free from diffractive gratings. FIG. 4 is a front view showing one example of how waveguide 32 may include one or more substrates having regions that include diffractive gratings for input coupler 34, cross-coupler 36, and/or output coupler 38 and having regions that are free from diffractive gratings.

As shown in FIG. 4, waveguide 32 may include one or more substrates 89 (e.g., a single substrate 89 or multiple stacked substrates 89) on one or more waveguides 32 (e.g., a single waveguide 32 or multiple stacked waveguides 32). Substrate(s) 89 may include one or more layers of grating media such as SRG substrate 76 (FIGS. 3A-3B). One or more diffractive grating structures 88 used to form optical couplers for waveguide 32 may be disposed or formed in substrate(s) 89. Each diffractive grating structure 88 may include one or more SRGs 74 (FIGS. 3A-3C).

For example, substrate(s) 89 may include a first diffractive grating structure 88A (sometimes referred to herein as grating structure 88A or grating(s) 88A) formed from a first set of one or more overlapping SRGs 74 (FIGS. 3A-3C) in a first region of substrate(s) 89. If desired, substrate(s) 89 may also include a second diffractive grating structure 88B (sometimes referred to herein as grating structure 88B or grating(s) 88B) formed from a second set of one or more overlapping SRGs 74 in a second region of substrate(s) 89 that is laterally separated from first diffractive grating structure 88A. If desired, substrate(s) 89 may further include a third diffractive grating structure 88C (sometimes referred to herein as grating structure 88C or grating(s) 88C) formed from a third set of one or more overlapping SRGs 74 in a third region of substrate(s) 89 that is laterally separated from first diffractive grating structure 88A and second diffractive grating structure 88B.

Diffractive grating structures 88A, 88B, and 88C may each form respective optical couplers for waveguide 32. For example, diffractive grating structure 88A may form input coupler 34 for waveguide 32. Diffractive grating structure 88B may form cross-coupler (e.g., pupil expander) 36 on waveguide 32. Diffractive grating structure 88C may form output coupler 38 for waveguide 32. Diffractive grating structure 88A may therefore couple a beam 92 of image light 30 into waveguide 32 and towards diffractive grating structure 88B. Diffractive grating structure 88B may redirect image light 30 towards diffractive grating structure 88C and may optionally perform pupil expansion on image light 30 (e.g., may split image light 30 into multiple paths to form a larger beam that covers the eye pupil and forms a more uniform image). Diffractive grating structure 88C may couple image light 30 out of waveguide 32 and towards the eye box. If desired, diffractive grating structure 88C may also perform pupil expansion on image light 30.

Substrate(s) 89 and thus waveguide 32 may also include one or more regions 90 that are free from diffractive grating structures 88, diffractive gratings, or optical couplers. Regions 90 may, for example, be free from ridges 78 and troughs 80 of any SRGs (FIGS. 3A-3C) and may, if desired, be free from refractive index modulations of VPHs. Regions 90 may separate diffractive grating structure 88A from diffractive grating structure 88B, may separate diffractive grating structure 88B from diffractive grating structure 88C, may separate diffractive grating structure 88C from diffractive grating structure 88A, and/or may laterally surround one or all of diffractive grating structures 88A-C. Regions 90 may sometimes be referred to herein as grating-free regions 90, inter-grating regions 90, non-grating regions 90, or non-diffractive regions 90. Non-diffractive regions 90 may, for example, include all of the lateral area of substrate(s) 89 that does not include a diffractive grating.

Each diffractive grating structure 88 in substrate(s) 89 may span a corresponding lateral area of substrate(s) 89. The lateral area spanned by each diffractive grating structure 88 is defined (bounded) by the lateral edge(s) 94 of that diffractive grating structure 88. Lateral edges 94 may separate or divide the portions of substrate(s) 89 that include thickness modulations used to form one or more SRG(s) in diffractive grating structures 88 from the non-diffractive regions 90 on substrate(s) 89. In other words, lateral edges 94 may define the boundaries between diffractive grating structures 88 and non-diffractive regions 90. Diffractive grating structures 88A, 88B, and 88C may have any desired lateral shapes (e.g., as defined by lateral edges 94).

The example of FIG. 4 is merely illustrative and, in general, input coupler 34, cross-coupler 36, and output coupler 38 may have any desired lateral outlines or shapes (e.g., as defined by lateral edges 94). If desired, waveguide 32 may include an optical coupler that both redirects and expands/replicates image light 30 (e.g., for filling as large of an eye box 24 with as uniform-intensity image light 30 as possible). Such an optical coupler, which is sometimes referred to herein as a diamond expander or interleaved coupler, may perform the functionality of both cross coupler 36 and output coupler 38. By using the optical coupler as both a cross-coupler and an output coupler, space may be conserved within the display (e.g., space that would otherwise be occupied by separate cross-coupler and output couplers).

Figure 5:
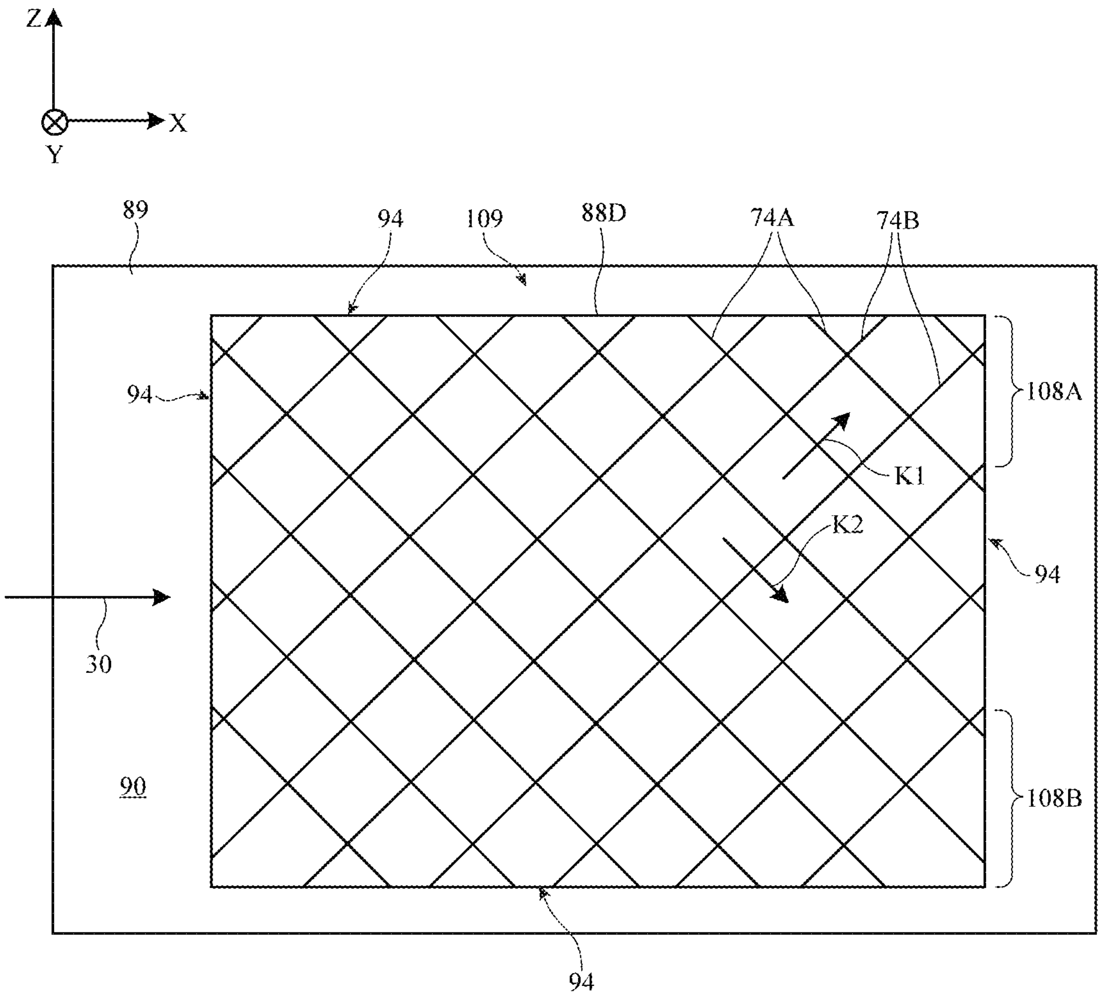
FIG. 5 is a front view of an illustrative waveguide having an optical coupler with first and second overlapping surface relief gratings oriented in different directions in accordance with some embodiments.

FIG. 5 is a front view of one such optical coupler 109 on waveguide 32. Optical coupler 109 may, for example, replace cross coupler 36 and output coupler 38 on waveguide 32 of FIG. 4. As shown in FIG. 5, optical coupler 109 may include a diffractive grating structure 88D having at least a first SRG 74A and a second SRG 74B on substrate(s) 89 (e.g., superimposed with each other in the same volume of a single substrate 89). Each of SRGs 74A and 74B may include a respective set of ridges 78 and troughs 80 (FIGS. 3A-3C) in substrate 89 and extending in different respective orientations. For example, SRG 74A may be characterized by a first grating vector K1 (e.g., oriented orthogonal to the direction of the peaks, troughs, or lines of constant medium thickness in SRG 74A). Similarly, SRG 74B may be characterized by a second grating vector K2 (e.g., oriented orthogonal to the direction of the peaks, troughs, or lines of constant medium thickness in SRG 74B). Grating vector K2 may be oriented non-parallel with respect to grating vector K1.

The magnitude of grating vector K1 corresponds to the widths and spacings (e.g., the period) of the ridges 78 and troughs 80 (fringes) in SRG 74A, as well as to the wavelengths of light diffracted by the SRG. The magnitude of grating vector K2 corresponds to the widths and spacings (e.g., the period) of the ridges 78 and troughs 80 in SRG 74B, as well as to the wavelengths of light diffracted by the SRG. Surface relief gratings generally have a wide bandwidth. The bandwidth of SRGs 74A and 74B may encompass each of the wavelengths in image light 30, for example (e.g., the entire visible spectrum, a portion of the visible spectrum, portions of the infrared or near-infrared spectrum, some or all of the visible spectrum and a portion of the infrared or near-infrared spectrum, etc.). The magnitude of grating vector K2 may be equal to the magnitude of grating vector K1 or may be different from the magnitude of grating vector K1. While illustrated within the plane of the page of FIG. 5 for the sake of clarity, grating vectors K1 and/or K2 may have non-zero vector components parallel to the Y-axis (e.g., grating vectors K1 and K2 may be tilted into or out of the page).

SRG 74A at least partially overlaps SRG 74B in optical coupler 109 (e.g., at least some of the ridges and troughs of each SRG spatially overlap or are superimposed within the same volume of SRG substrate). If desired, the strength of SRG 74A and/or SRG 74B may be modulated in the vertical direction (e.g., along the Z-axis) and/or in the horizontal direction (e.g., along the X-axis). If desired, one or both of SRGs 74A and 74B may have a magnitude that decreases to zero within peripheral regions 108A and 108B of the field of view, which may help to mitigate the production of rainbow artifacts.

Input coupler 34 (FIG. 2) may couple image light 30 into waveguide 32, which conveys the image light to optical coupler 109 through waveguide 32 (e.g., via total internal reflection). SRGs 74A and 74B may diffract incident image light 30 in two different directions, thereby replicating pupils of the image light. SRGs 74A and 74B may additionally or alternatively expand pupils of the image light. This creates multiple optical paths for image light 30 within optical coupler 89 and allows as large an eye box as possible to be filled with image light 30 of uniform intensity.

As shown in FIG. 5, diffractive grating structure 88D may span a corresponding lateral area of substrate(s) 89. The lateral area spanned by diffractive grating structure 88D is defined (bounded) by the lateral edge(s) 94 of diffractive grating structure 88D. Lateral edges 94 may separate or divide the portions of substrate(s) 89 that include thickness modulations used to form one or more SRG(s) in diffractive grating structures 88D from the non-diffractive regions 90 on substrate(s) 89. In other words, lateral edges 94 may define the boundaries between diffractive grating structures 88D and non-diffractive regions 90. Diffractive grating structures 88D may have any desired lateral shape (e.g., as defined by lateral edges 94).

Figure 6:
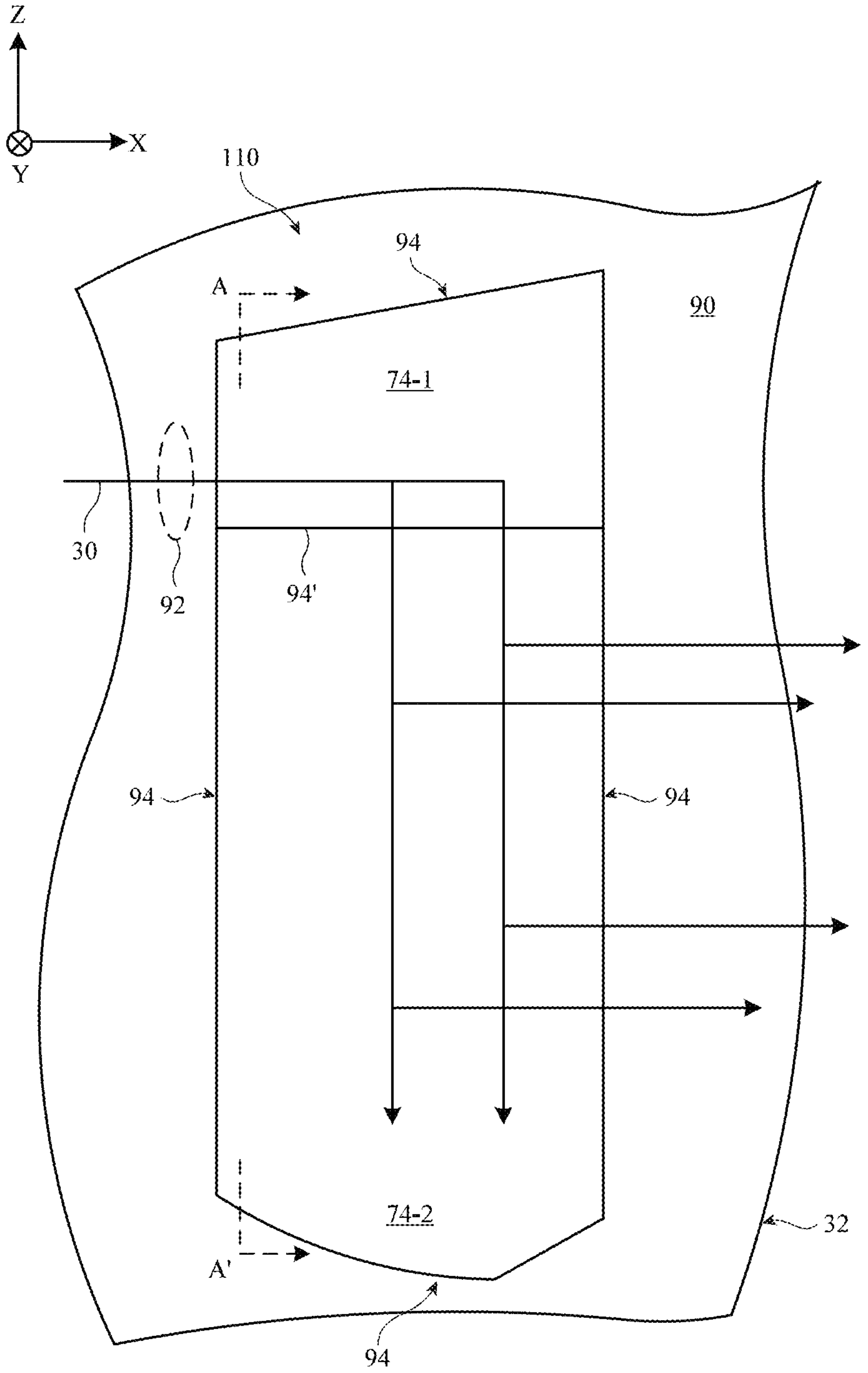
FIG. 6 is a front view of an illustrative optical coupler having a first surface relief grating that meets a second surface relief grating at a lateral boundary in accordance with some embodiments.

If desired, waveguide 32 may include an optical coupler that includes two surface relief gratings 74 that meet at a lateral boundary. FIG. 6 is a front view showing one example of how waveguide 32 may include an optical coupler 110 that includes two surface relief gratings 74 that meet at a lateral boundary. As shown in FIG. 6, optical coupler 110 may span at least a first lateral region (area) and a second region (area) of waveguide 32 adjacent to the first region. Optical coupler 110 may include a first diffractive grating structure within (e.g., confined to) the first region. The first diffractive grating structure may include one or more SRGs such as at least SRG 74-1. Optical coupler 110 may also include a second diffractive grating structure within (e.g., confined to) the second region. The second diffractive grating structure may include one or more SRGs such as at least SRG 74-2.

The first and second regions may each have lateral edges 94 that separate the SRGs in the first and second regions from non-diffractive regions 90 of waveguide 32. Lateral edges 94 may sometimes also be referred to herein as lateral boundaries 94 or simply as boundaries 94. The first region (e.g., SRG 74-1) may laterally meet the second region (e.g., SRG 74-2) on waveguide 32 at a lateral boundary formed by the lateral edge 94' of first and second regions (e.g., the first region and SRG 74-1 may laterally contact or abut the second region and SRG 74-2). Lateral edge 94' may therefore sometimes be referred to herein as the lateral boundary 94' between SRGs 74-1 and 74-2 or simply as boundary 94'.

SRG 74-1 and SRG 74-2 may both interact with (diffract) image light 30 as the image light propagates through waveguide 32 towards the eye box. If desired, SRG 74-1 may receive image light 30 and may redirect (diffract) image light 30 towards SRG 74-2. SRG 74-2 may then redirect (diffract) image light 30 elsewhere on waveguide 32.

Optical coupler 110 may form the interleaved coupler of FIG. 5 (e.g., optical coupler 109 of FIG. 5), input coupler 34 of FIGS. 2 and 4, cross-coupler 36 of FIGS. 2 and 4, output coupler 38 of FIG. 4, an optical coupler that redirects infrared light (e.g., for performing gaze detection and tracking), and/or any other desired optical coupler on waveguide 32. An implementation in which optical coupler 110 forms cross-coupler 36 of FIGS. 2 and 4 is shown in FIG. 6 as an example. As such, SRG 74-1 may receive image light 30 from input coupler 34 (FIG. 4). SRG 74-1 may diffract image light 30 in the −Z direction towards SRG 74-2. SRG 74-2 may diffract image light 30 in the +X direction towards output coupler 38 (FIG. 4).

SRG 74-1 may impart a first optical phase to the image light 30 diffracted by SRG 74-1. SRG 74-2 may impart a second optical phase to the image light 30 diffracted by SRG 74-2. The second phase may be different from the first phase. In practice, when the beam 92 of image light 30 hits boundary 94' between SRG 74-1 and SRG 74-2, part of the beam is diffracted with the first phase whereas another part of the beam is diffracted with the second phase. Similarly, non-diffractive regions 90 may impart a different phase to incident light 30 than SRG 74-1 and/or SRG 74-2. As such, when the beam 92 of image light 30 hits a boundary 94 between an SRG 74 and a non-diffractive region 90, part of the beam is diffracted with the phase imparted by the SRG whereas another part of the beam is transmitted and/or reflected by non-diffractive region 90 with a different phase. If care is not taken, these differences in phase across beam 92 may produce unsightly directional artifacts in the image light provided to the eye box and/or may limit the modulation transfer function (MTF) of the display.

Figure 7:
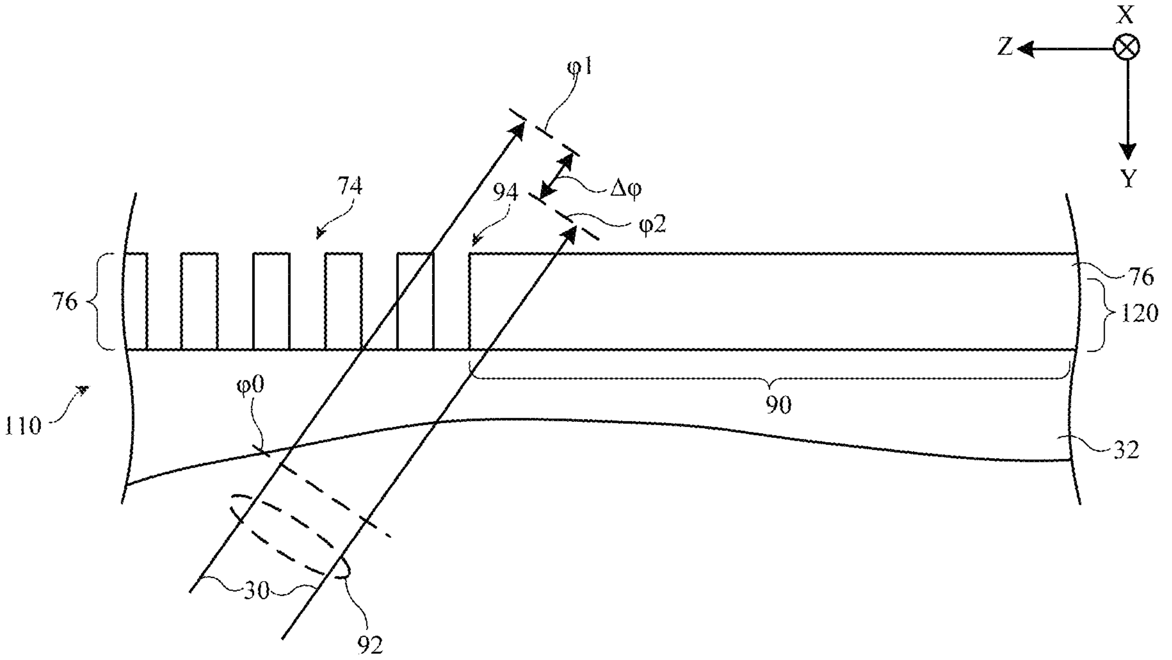
FIG. 7 is a cross-sectional top view of an illustrative waveguide having a boundary between a surface relief grating in a medium and a non-diffractive portion of the medium in accordance with some embodiments.

FIG. 7 is a cross-sectional top view (e.g., as taken along line AA' of FIG. 6) showing one example of how a boundary 94 between an SRG 74 in optical coupler 110 and non-diffractive region 90 may impart different phases across a beam 92 of incident light 30. As shown in FIG. 7, SRG substrate 76 may be layered onto waveguide 32. Optical coupler 110 may include SRG 74. SRG 74 may be separated from non-diffractive region 90 by boundary 94.

A beam (e.g., pupil) 92 of image light 30 may be incident upon boundary 94 with a uniform initial phase $\phi_0$ across the area subtended by beam 92. When image light 30 hits SRG layer 76, SRG 74 may impart a first phase $\phi_1$ to the portion of the beam incident on SRG 74 upon transmitting, reflecting, and/or diffracting that portion of the beam. At the same time, non-diffractive region 90 may impart a second phase $\phi_2$ to the portion of the beam incident on non-diffractive region 90 upon transmitting and/or reflecting that portion of the beam. This effectively produces a phase difference $\Delta\phi$ across beam 92 after image light 30 hits boundary 94, which can produce undesirable directional artifacts and/or limit the modulation transfer function (MTF) of the display in providing image light 30 to eye box 24 (FIG. 2).

Figure 8:
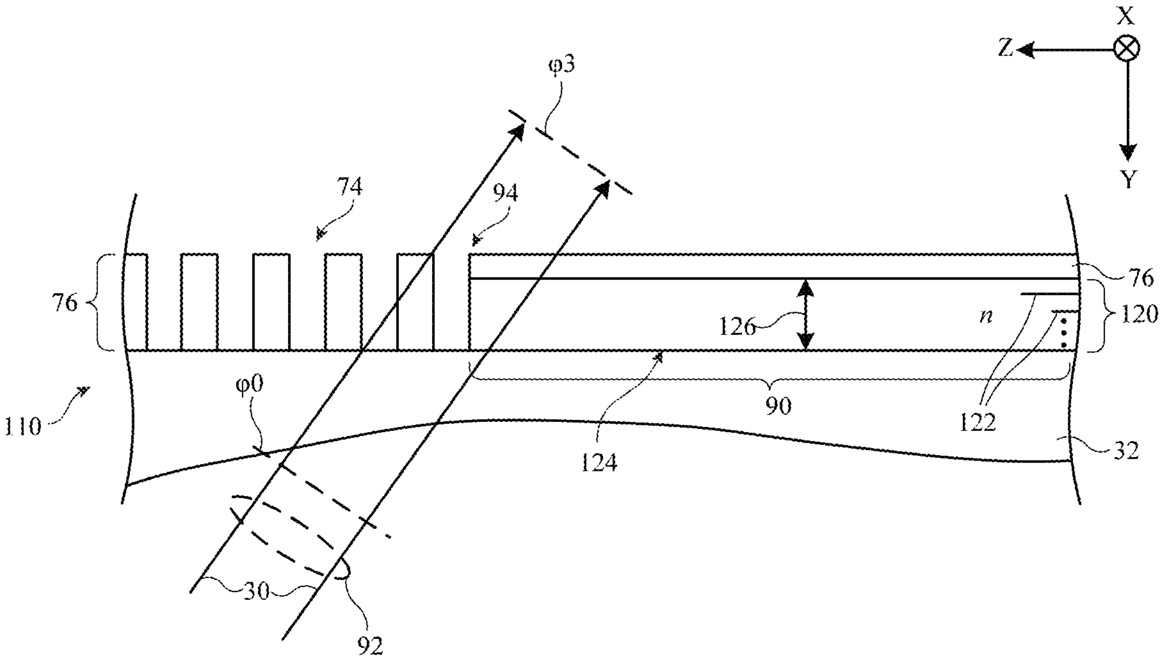
FIG. 8 is a cross-sectional top view of an illustrative waveguide having a phase compensation layer that mitigates phase differences imparted to incident light across a boundary between a surface relief grating in a medium and a non-diffractive portion of the medium in accordance with some embodiments.

To mitigate the phase difference $\Delta\phi$ across beam 92, waveguide 32 may be provided with a phase compensation layer at, abutting, or adjacent to boundary 94, as shown in the example of FIG. 8. As shown in FIG. 8, a phase compensation layer 120 may be layered onto lateral surface 124 of waveguide 32 (e.g., within or overlapping non-diffractive region 90). Non-diffractive region 90 of SRG substrate 76 may be layered on top of phase compensation layer 120 (e.g., phase compensation layer 120 may be interposed or sandwiched between non-diffractive region 90 of SRG substrate 76 and waveguide 32). In this way, boundary 94 may be the lateral boundary between SRG 74 and the stack including non-diffractive region 90 of SRG substrate 76 and phase compensation layer 120.

Phase compensation layer 120 may have a thickness 126 (e.g., parallel to the Y-axis) and a refractive index n. Thickness 126 and refractive index n may be selected to tune the optical path length of the portion of image light 30 transmitted and/or reflected by non-diffractive region 90 of SRG substrate 76 to match the optical path length of the portion of image light 30 transmitted and/or reflected (e.g., diffracted) by SRG 74 (e.g., across both the range of incident angles and the wavelengths of image light 30). This may cause the portion of image light 30 incident upon non-diffractive region 90 of SRG substrate 76 to exhibit the same phase after transmission and/or reflection through non-diffractive region 90 of SRG substrate 76 as is imparted by SRG 74 to the portion of image light 30 incident upon SRG 74 after being transmitted, reflected, and/or diffracted by SRG 74. In other words, phase compensation layer 120 may cause image light 30 to exhibit a constant phase $\phi 3$ across the entire area subtended by beam 92 upon transmission, reflection, and/or diffraction by SRG substrate 76 at boundary 94. This may serve to minimize undesirable directional artifacts and/or maximize the modulation transfer function (MTF) of the display in providing image light 30 to eye box 24 (FIG. 2).

Phase compensation layer 120 may include a single layer of material (e.g., a dielectric or any other desired material that retards or phase-delays light transmitted through and/or reflected by phase compensation layer 120 in a manner that matches the phase imparted by SRG 74). Alternatively, if desired, phase compensation layer 120 may include a stack of two or more sub-layers 122. Sub-layers 122 may each have the same thickness or two or more of sub-layers 122 may have different thicknesses. Sub-layers 122 may be formed from the same material or two or more of sub-layers 122 may be formed from different materials (e.g., dielectric materials). Sub-layers 122 may have the same refractive index or two or more sub-layers may have different refractive indices. The number, composition, refractive index, and/or thickness of sub-layers 122 may be selected to tune the optical path length of the portion of image light 30 transmitted or reflected by non-diffractive region 90 of SRG substrate 76 to match the optical path length of the portion of image light 30 transmitted or reflected (e.g., diffracted) by SRG 74, and/or to help adhere the phase compensation layer to waveguide 32 and/or SRG substrate 76.

The example of FIG. 8 is illustrative and non-limiting. If desired, phase compensation layer 120 may be disposed over non-diffractive region 90 of SRG medium 76 (e.g., non-diffractive region 90 of SRG medium 76 may be interposed between phase compensation layer 120 and waveguide 32). If desired, a first phase-compensation layer 120 may be layered under non-diffractive region 90 whereas a second phase-compensation layer 120 is layered over non-diffractive region 90. Additionally or alternatively, a phase compensation layer 120 may be layered under SRG 74 (e.g., between SRG 74 and waveguide 32) and/or over SRG 74.

Figure 9:
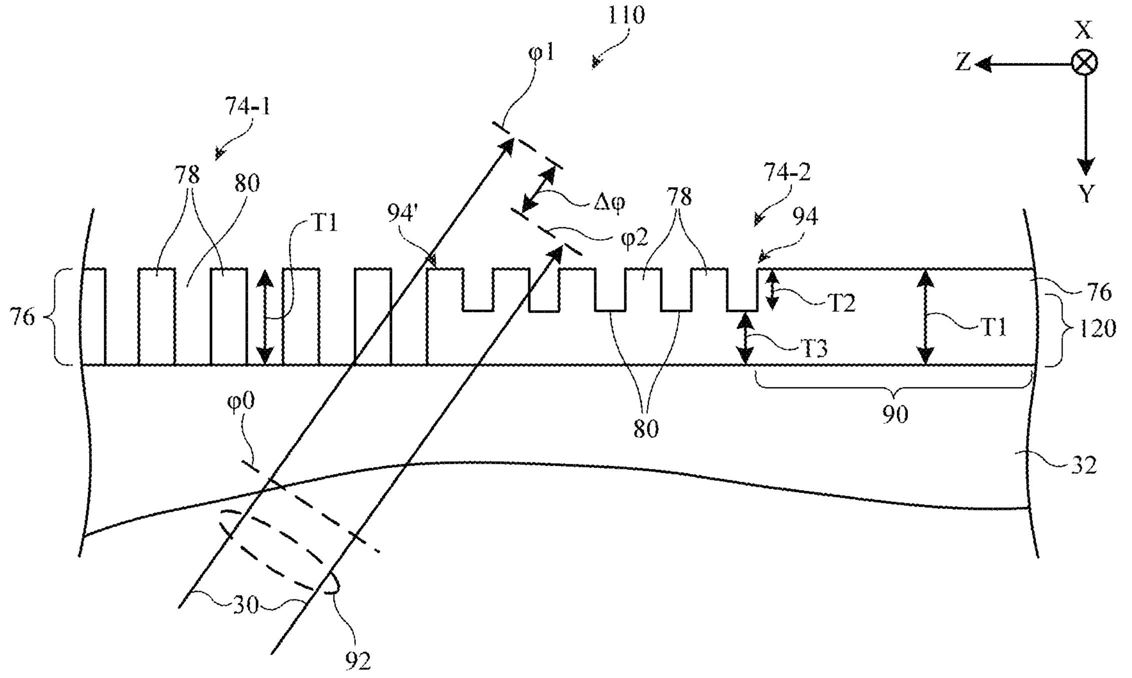
FIG. 9 is a cross-sectional top view of an illustrative waveguide having a boundary between first and second surface relief gratings in a medium with a uniform thickness across the first and second surface relief gratings in accordance with some embodiments.

FIG. 9 is a cross-sectional top view showing one example of how a boundary 94' between a first SRG 74-1 in optical coupler 110 and a second SRG 74-2 in optical coupler 110 may impart different phases across a beam 92 of incident light 30. As shown in FIG. 9, optical coupler 110 may include SRG 74-1 and SRG-742. SRGs 74-1 and 74-2 may meet at boundary 94'. SRG 74-2 may meet non-diffractive region 90 of SRG substrate 76 at boundary 94.

In the example of FIG. 9, SRG substrate 76 exhibits a uniform overall thickness across SRGs 74-1 and 74-2. For example, SRG substrate 76 may have a thickness T1 within non-diffractive region 90, SRG 74-1, and SRG 74-2. The ridges 78 of SRG 74-1 may have ridge heights equal to thickness T1. Equivalently, the troughs 80 of SRG 74-1 may have trough depths equal to thickness T1. The ridges 78 in SRG 74-2 may have ridge heights equal to thickness T2 less than thickness T1. Equivalently, the troughs 80 in SRG 74-2 may have trough depths equal to thickness T2. In this way, the bottom of the troughs 80 in SRG 74-2 are separated from lateral surface 124 of waveguide 32 and SRG substrate 76 exhibits an overall thickness of T1 within SRG 74-2 (e.g., where T1=T2+T3) and within SRG 74-1. This is merely illustrative and, in general, the troughs 80 in SRG 74-1 may have other trough depths less than thickness T1 and/or the ridges 78 in SRG 74-1 may have other ridge heights less than thickness T1. If desired, the troughs (ridges) in SRGs 74-1 and 74-2 may have the same trough depths (ridge heights) but SRGs 74-1 and 74-2 may have ridges or troughs of different shapes, blaze angles, and/or duty cycles.

A beam (e.g., pupil) 92 of image light 30 may be incident upon boundary 94' with a uniform initial phase $\phi_0$ across the area subtended by beam 92. When image light 30 hits SRG layer 76, SRG 74-1 may impart a first phase $\phi_1$ to the portion of the beam incident on SRG 74-1 upon transmitting, reflecting, and/or diffracting that portion of the beam. At the same time, SRG 74-2 may impart a second phase $\phi_2$ to the portion of the beam incident on SRG 74-2 upon transmitting, reflecting, and/or diffracting that portion of the beam. This effectively produces a phase difference $\Delta\phi$ across beam 92 after image light 30 hits SRG substrate 76, which can produce undesirable directional artifacts and/or limit the modulation transfer function (MTF) of the display in providing image light 30 to eye box 24 (FIG. 2).

Figure 10:
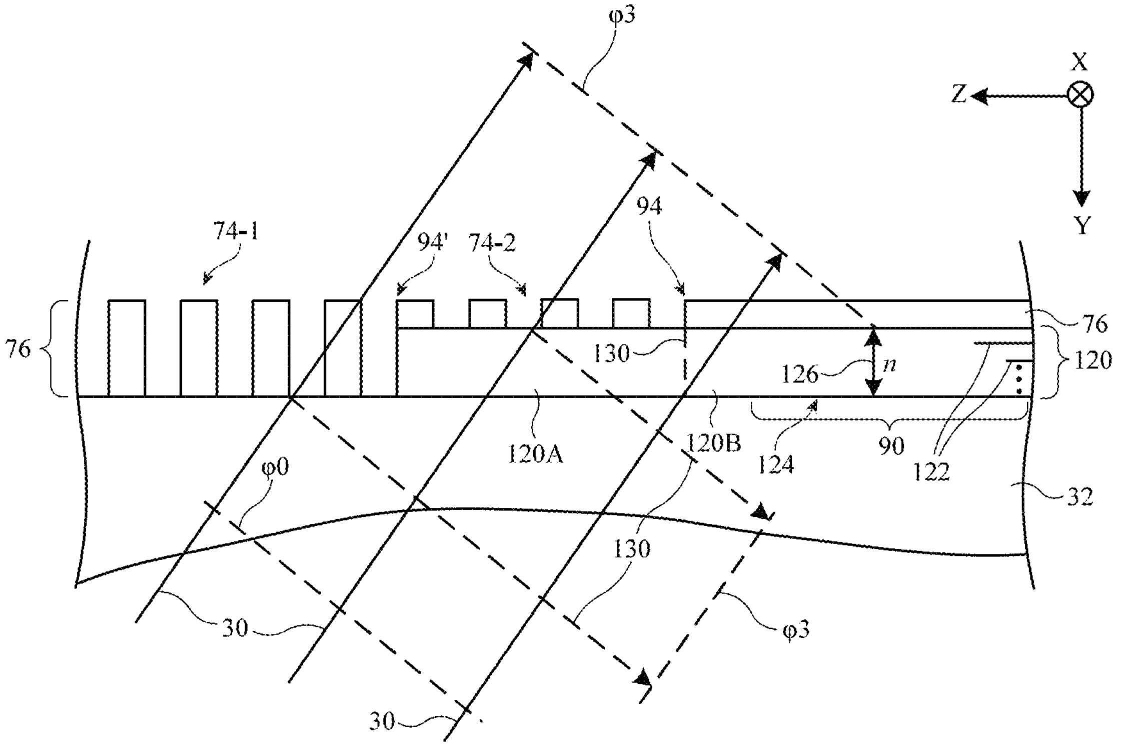
FIG. 10 is a cross-sectional top view of an illustrative waveguide having a phase compensation layer that mitigates phase differences imparted to incident light across a boundary between first and second surface relief gratings in a medium with a uniform thickness across the first and second surface relief gratings in accordance with some embodiments.

To mitigate the phase difference $\Delta\phi$ across beam 92, waveguide 32 may be provided with a phase compensation layer at, abutting, adjacent to, and/or overlapping boundary 94' and/or boundary 94, as shown in the example of FIG. 10. As shown in FIG. 10, a phase compensation layer 120 may be layered onto lateral surface 124 of waveguide 32 between SRG 74-2 and waveguide 32. If desired, phase compensation layer 120 may be extended beyond SRG 74-2 and may also be interposed between non-diffractive region 90 of SRG substrate 76 and waveguide 32. SRG 74-2 and non-diffractive region 90 of SRG substrate 76 may be layered on top of phase compensation layer 120 (e.g., phase compensation layer 120 may be interposed or sandwiched between non-diffractive region 90 of SRG substrate 76 and waveguide 32 and between SRG 74-2 and waveguide 32). In this way, boundary 94' may be the lateral boundary between SRG 74-1 and the stack including SRG 74-2 and phase compensation layer 120.

Thickness 126 and refractive index n of phase compensation layer 120 may be selected to tune the optical path length of the portion of image light 30 transmitted and/or reflected (e.g., diffracted) by SRG 74-2 to match the optical path length of the portion of image light 30 transmitted and/or reflected (e.g., diffracted) by SRG 74-1 (e.g., across both the range of incident angles and the wavelengths of image light 30). This may cause the portion of image light 30 incident upon SRG 74-2 to exhibit the same phase after transmission and/or reflection (e.g., diffraction) through SRG 74-2 as is imparted by SRG 74-1 to the portion of image light 30 incident upon SRG 74-1 after being transmitted, reflected, and/or diffracted by SRG 74-1. In other words, phase compensation layer 120 may cause image light 30 to exhibit a constant phase $\phi 3$ across the entire area subtended by beam 92 after interacting with SRG substrate 76 at boundary 94'.

If desired, the thickness 126 and refractive index n may be selected so that phase compensation layer 120 also causes the image light 30 incident upon non-diffractive region 90 to exhibit the same phase $\phi 3$ upon transmission and/or reflection by non-diffractive region 76 of SRG substrate 76 (e.g., across boundary 94, as described above in connection with FIG. 8). In this way, phase compensation layer 120 may configure image light 30 to exhibit uniform (constant) phase $\phi 3$ even when the image light is incident upon SRG substrate 76 across both boundary 94 and boundary 94'.

Alternatively, phase compensation layer 120 may be split into at least a first phase compensation layer 120A and a second phase compensation layer 120B at/across boundary 94 (e.g., phase compensation layer 120A may laterally abut or contact phase compensation layer 120B at joint 130, which overlaps or is aligned with boundary 94). In these implementations, phase compensation layer 120A may have a thickness and/or refractive index (e.g., different from the thickness and/or refractive index of phase compensation layer 120B) that is selected to match the optical path length of image light 30 after interacting with SRG 74-2 to the optical path length of image light 30 after interacting with SRG 74-1 (e.g., across both the range of incident angles and the wavelengths of image light 30). At the same time, the thicknesses and/or refractive indices of phase compensation layers 120A and 120B may be selected to match the optical path length of image light 30 after interacting with SRG 74-2 to the optical path length of the image light 30 after interacting with non-diffractive region 90 of SRG substrate 76.

In general, the phase compensation layer(s) 120 on waveguide 32 may be tuned to provide image light 30 with constant phase $\phi 3$ across boundary 94' and/or boundary 94 for image light that is reflected at SRG substrate 76 (e.g., as shown by arrows 130) and/or transmitted by SRG substrate 76. This may serve to minimize undesirable directional artifacts and/or maximize the modulation transfer function (MTF) of the display in providing image light 30 to eye box 24 (FIG. 2).

The example of FIG. 10 is illustrative and non-limiting. If desired, phase compensation layer 120 may be disposed over non-diffractive region 90 of SRG medium 76 (e.g., non-diffractive region 90 of SRG medium 76 may be interposed between phase compensation layer 120 and waveguide 32) and/or over SRG 74-2 (e.g., SRG 74-2 may be interposed between phase compensation layer 120 and waveguide 32). If desired, a first phase-compensation layer 120 may be layered under SRG 74-2 and/or non-diffractive region 90 whereas a second phase-compensation layer 120 is layered over SRG 74-2 and/or non-diffractive region 90. Additionally or alternatively, a phase compensation layer 120 may be layered under SRG 74-1 (e.g., between SRG 74-1 and waveguide 32) and/or over SRG 74-1.

Figure 11:
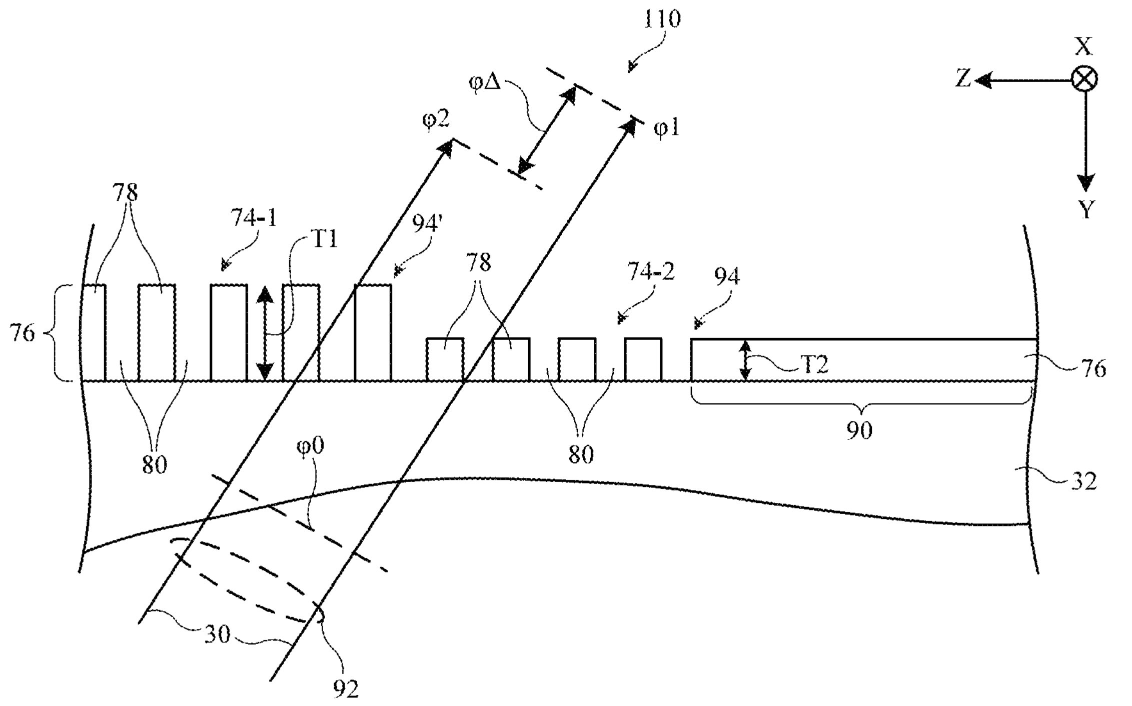
FIG. 11 is a cross-sectional top view of an illustrative waveguide having a boundary between first and second surface relief gratings in a medium with a non-uniform thickness across the first and second surface relief gratings in accordance with some embodiments.

The example of FIGS. 9 and 10 in which SRG substrate 76 exhibits a uniform thickness T1 across non-diffractive region 90, SRG 74-1, and SRG 74-2 is illustrative and non-limiting. If desired, SRG substrate 76 may exhibit a non-uniform thickness across non-diffractive region 90, SRG 74-1, and SRG 74-2, as shown in the example of FIG. 11. As shown in FIG. 11, SRG substrate 76 may have a thickness T1 within SRG 74-1 and a second thickness T2 less than thickness T1 in SRG 74-2 and non-diffractive region 90. The ridges 78 of SRG 74-2 may therefore have ridge heights equal to thickness T2. Equivalently, the troughs 80 of SRG 74-2 may have trough depths equal to thickness T2. In this way, the bottom of the troughs 80 in SRG 74-2 are defined by lateral surface 124 of waveguide 32 and SRG substrate 76 exhibits an overall thickness of T2 within SRG 74-2. This is merely illustrative and, in general, the troughs 80 in SRG 74-2 may have other trough depths less than thickness T2 (e.g., such that troughs 80 do not touch waveguide 32).

A beam (e.g., pupil) 92 of image light 30 may be incident upon boundary 94' with a uniform initial phase $\phi_0$ across the area subtended by beam 92. When image light 30 hits SRG layer 76, SRG 74-1 may impart a first phase $\phi_1$ to the portion of the beam incident on SRG 74-1 upon transmitting, reflecting, and/or diffracting that portion of the beam. At the same time, SRG 74-2 may impart a second phase $\phi_2$ to the portion of the beam incident on SRG 74-2 upon transmitting, reflecting, and/or diffracting that portion of the beam. This effectively produces a phase difference $\Delta\phi$ across beam 92, which can produce undesirable directional artifacts and/or limit the modulation transfer function (MTF) of the display in providing image light 30 to eye box 24 (FIG. 2).

Figure 12:
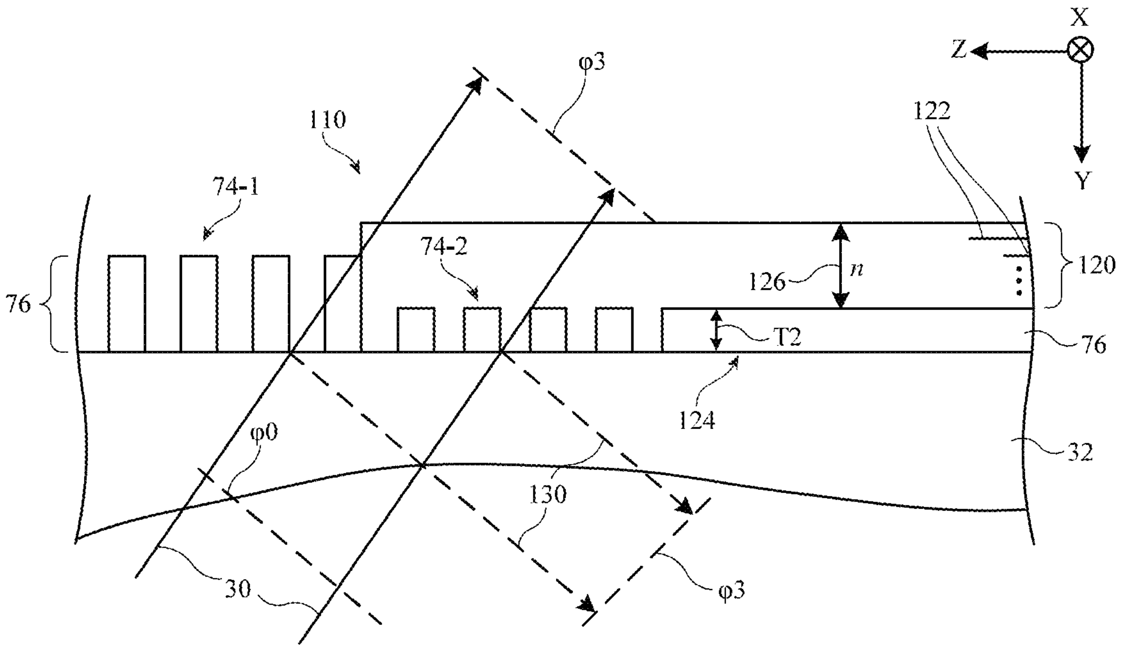
FIG. 12 is a cross-sectional top view of an illustrative waveguide having a phase compensation layer that mitigates phase differences imparted to incident light across a boundary between first and second surface relief gratings in a medium with a non-uniform thickness across the first and second surface relief gratings in accordance with some embodiments.

To mitigate the phase difference $\Delta\phi$ across beam 92, waveguide 32 may be provided with a phase compensation layer at, abutting, adjacent to, and/or overlapping boundary 94 and/or boundary 94', as shown in the example of FIG. 12. As shown in FIG. 12, a phase compensation layer 120 may be layered over SRG 74-2 and non-diffractive region 90. Phase compensation layer 120 may fill the troughs of SRG 74-2 if desired. Phase compensation layer 120 may extend above the ridges of SRG 74-1 if desired.

Thickness 126 and refractive index n of phase compensation layer 120 may be selected to tune the optical path length of the portion of image light 30 transmitted and/or reflected (e.g., diffracted) by SRG 74-2 to match the optical path length of the portion of image light 30 transmitted and/or reflected (e.g., diffracted) by SRG 74-1 (e.g., across both the range of incident angles and the wavelengths of image light 30). This may cause the portion of image light 30 incident upon SRG 74-2 to exhibit the same phase after transmission and/or reflection (e.g., diffraction) through SRG 74-2 as is imparted by SRG 74-1 to the portion of image light 30 incident upon SRG 74-1 after being transmitted, reflected, and/or diffracted by SRG 74-1. In other words, phase compensation layer 120 may cause image light 30 to exhibit a constant phase $\phi$3 across the entire area subtended by beam 92 upon transmission, reflection, and/or diffraction at boundary 94'. If desired, the thickness 126 and refractive index n may be selected so that phase compensation layer 120 also causes the image light 30 incident upon non-diffractive region 90 to exhibit the same phase $\phi$3 upon transmission and/or reflection by non-diffractive region 76 of SRG substrate 76 (e.g., across boundary 94, as described above in connection with FIG. 8). In this way, phase compensation layer 120 may configure image light 30 to exhibit uniform (constant) phase $\phi$3 even when the image light is incident upon SRG substrate 76 across both boundary 94 and boundary 94'.

Alternatively, phase compensation layer 120 may be split into at least a first phase compensation layer and a second phase compensation layer at/across boundary 94 (e.g., as shown by phase compensation layers 120A and 120B of FIG. 10). In general, the phase compensation layer(s) 120 on waveguide 32 may be tuned to provide image light 30 with constant phase $\phi$3 across boundary 94' and/or boundary 94 for image light that is reflected at SRG substrate 76 (e.g., as shown by arrows 130) and/or transmitted by SRG substrate 76. This may serve to minimize undesirable directional artifacts and/or maximize the modulation transfer function (MTF) of the display in providing image light 30 to eye box 24 (FIG. 2).

The example of FIG. 12 is illustrative and non-limiting. If desired, phase compensation layer 120 may be disposed under non-diffractive region 90 of SRG substrate 76 (e.g., non-diffractive region 90 of SRG substrate 76 may be interposed between phase compensation layer 120 and waveguide 32) and/or under SRG 74-2 (e.g., SRG 74-2 may be interposed between phase compensation layer 120 and waveguide 32). If desired, a first phase-compensation layer 120 may be layered under SRG 74-2 and/or non-diffractive region 90 whereas a second phase-compensation layer 120 is layered over SRG 74-1 and/or non-diffractive region 90. Additionally or alternatively, a phase compensation layer 120 may be layered under SRG 74-1 (e.g., between SRG 74-1 and waveguide 32) and/or over SRG 74-1.

The examples of FIGS. 7-12 are illustrative and non-limiting. Additional layers may be layered between SRG substrate 76 and waveguide 32 (e.g., etch stop layers, dielectric layers, metal layers, optically clear adhesive layers, polarizer layers, etc.) and/or over SRG substrate 76 (e.g., an encapsulation layer, dielectric layers, metal layers, a metal layer that fills one or more of the troughs of one or more of the SRGs, etc.). Phase compensation layer 120 may sometimes also be referred to herein as phase delay layer 120, phase mitigation layer 120, or simply as layer 120.

Figure 13:
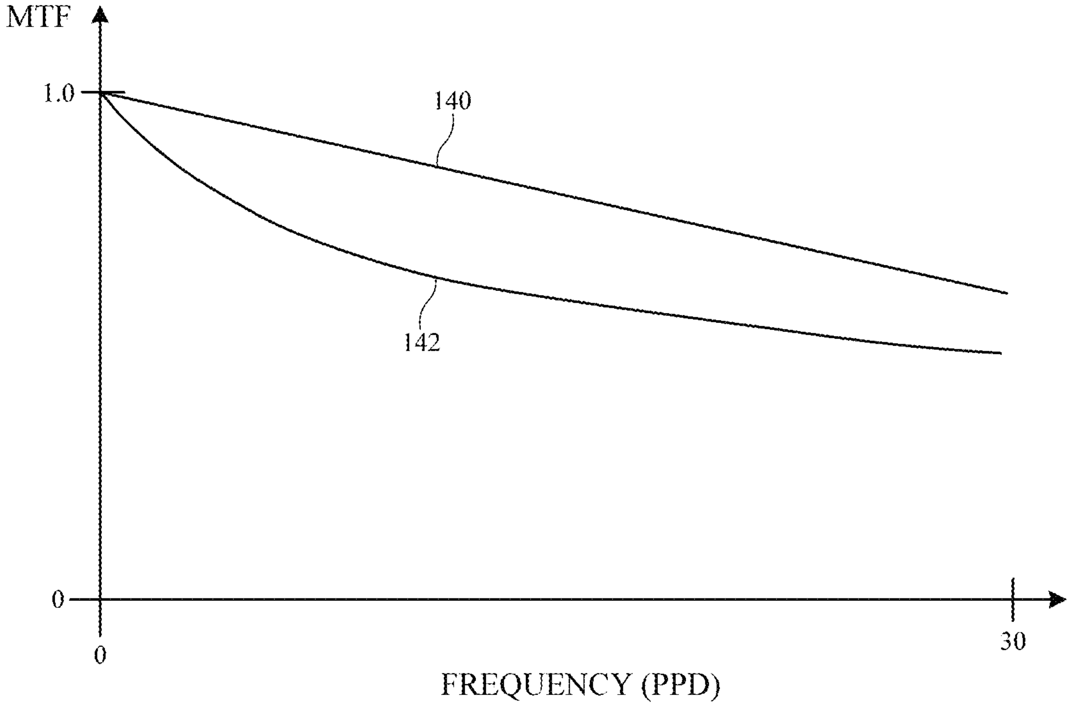
FIG. 13 is a plot of modulation transfer function as a function of frequency that illustrates how a phase compensation layer of the types shown in FIGS. 8, 10, and 12 may optimize optical performance of a display in accordance with some embodiments.

FIG. 13 is a plot of modulation transfer function (MTF) as a function of frequency (PPD) that illustrates how a phase compensation layer 120 may optimize optical performance of a display in accordance with some embodiments. Curve 142 illustrates the MTF in the absence of phase compensation layer 120. Curve 144 illustrates the MTF with phase compensation layer at or adjacent to boundary 94 and/or boundary 94'. As shown by curves 142 and 144, phase compensation layer 120 may serve to maximize MTF and thus the optical performance of the display. Curves 142 and 144 may have other shapes in practice.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

System 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:
a waveguide configured to propagate light;
a substrate on the waveguide, the substrate having a first region and a second region that meets the first region at a boundary;
a surface relief grating (SRG) in the first region of the substrate and configured to diffract the light; and
a phase compensation layer overlapping the second region of the substrate.

2. The electronic device of claim 1, wherein the second region of the substrate is non-diffractive.

3. The electronic device of claim 2, wherein the phase compensation layer is interposed between the substrate and the waveguide.

4. The electronic device of claim 1, further comprising:
an additional SRG in the second region of the substrate and configured to diffract the light.

5. The electronic device of claim 4, wherein the phase compensation layer is interposed between the substrate and the waveguide.

6. The electronic device of claim 5, wherein the first SRG has a first trough depth and the second SRG has a second trough depth less than the first trough depth.

7. The electronic device of claim 4, wherein the substrate is layered between the phase compensation layer and the waveguide.

8. The electronic device of claim 7, wherein the first SRG has first troughs with a first trough depth, the second SRG has second troughs with a second trough depth less than the first trough depth, and the phase compensation layer fills the second troughs.

9. The electronic device of claim 4, wherein the SRG has a non-diffractive region that meets the second region at an additional boundary and wherein the phase compensation layer overlaps the additional boundary and the non-diffractive region.

10. The electronic device of claim 4, wherein the SRG has a non-diffractive region that meets the second region at an additional boundary, the electronic device further comprising:
an additional phase compensation layer that overlaps the non-diffractive region and that meets the phase compensation layer at a joint aligned with the boundary.

11. The electronic device of claim 1, wherein the phase compensation layer comprises a stack of sub-layers.

12. A display comprising:
a waveguide configured to propagate light;
a substrate on the waveguide, the substrate having a first region and a non-diffractive region that laterally abuts the first region at a boundary;
a surface relief grating (SRG) in the first region of the substrate, wherein a first portion of the light is incident upon the SRG and a second portion of the light is incident upon the non-diffractive region; and
a layer overlapping the non-diffractive region of the substrate, wherein the layer has a thickness and a refractive index configured to match a phase of the second portion of the light to a phase of the first portion of the light.

13. The display of claim 12, wherein the layer is interposed between the substrate and the waveguide and wherein the layer is non-overlapping with respect to the first region of the substrate.

14. The display of claim 12, wherein the layer comprises a stack of sub-layers.

15. The display of claim 14, wherein two or more of the sub-layers in the stack have different refractive indices.

16. The display of claim 14, wherein two or more of the sub-layers in the stack have different thicknesses.

17. A display comprising:
a waveguide configured to propagate light;
a substrate on the waveguide, the substrate having a first region and a second region that laterally meets the first region at a boundary;
a first surface relief grating (SRG) in the first region of the substrate, wherein a first portion of the light is incident upon the first SRG;
a second SRG in the second region of the substrate, wherein a second portion of the light is incident upon the second SRG; and
a layer overlapping the second region of the substrate, wherein the layer has a thickness and a refractive index configured to match a phase of the second portion of the light to a phase of the first portion of the light.

18. The display of claim 17, wherein the layer is interposed between the substrate and the waveguide and wherein the layer is non-overlapping with respect to the first region of the substrate.

19. The display of claim 17, wherein the substrate is interposed between the layer and the waveguide and wherein the layer is non-overlapping with respect to the first region of the substrate.

20. The display of claim 17, wherein the layer comprises a stack of sub-layers.

* * * * *